US009802824B2

(12) United States Patent
Yanagi et al.

(10) Patent No.: US 9,802,824 B2
(45) Date of Patent: Oct. 31, 2017

(54) GRANULAR ACTIVATED CARBON, AND MANUFACTURING METHOD FOR SAME

(71) Applicant: Osaka Gas Chemicals Co., Ltd., Osaka (JP)

(72) Inventors: Juichi Yanagi, Osaka (JP); Noriko Matsumoto, Osaka (JP)

(73) Assignee: OSAKA GAS CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/768,925

(22) PCT Filed: Feb. 14, 2014

(86) PCT No.: PCT/JP2014/053551
§ 371 (c)(1),
(2) Date: Aug. 19, 2015

(87) PCT Pub. No.: WO2014/129409
PCT Pub. Date: Aug. 28, 2014

(65) Prior Publication Data
US 2015/0376015 A1     Dec. 31, 2015

(30) Foreign Application Priority Data

Feb. 20, 2013  (JP) ................................ 2013-031208

(51) Int. Cl.
*C01B 31/08* (2006.01)
*C01B 31/10* (2006.01)
(Continued)

(52) U.S. Cl.
CPC ............... *C01B 31/08* (2013.01); *B01J 20/20* (2013.01); *B01J 20/305* (2013.01);
(Continued)

(58) Field of Classification Search
CPC .............. B01J 20/20; B01J 20/28073; B01J 20/28011; B01J 20/3078; B01J 20/3064; B01J 21/18; C01B 31/125
See application file for complete search history.

(56) References Cited

U.S. PATENT DOCUMENTS

2002/0114126 A1   8/2002   Hirahara et al.
2003/0179537 A1   9/2003   Tanaka et al.
(Continued)

FOREIGN PATENT DOCUMENTS

CN   102056842   5/2011
EP     2960206   12/2015
(Continued)

OTHER PUBLICATIONS

European Search Report based on co-pending European Application No. 14753501.7, dated Sep. 26, 2016, 9 Pages.
(Continued)

*Primary Examiner* — Richard M Rump
(74) *Attorney, Agent, or Firm* — McCarter & English, LLP (57) ABSTRACT

Provided is a granular activated carbon that can be used for applications similar to wood-based steam-activated carbons; and also provided is a method for manufacturing the same. The granular activated carbon is obtained in the following manner. An activated carbon raw material is carbonized, and then pulverized. The pulverized product is then mixed with a calcium component, and the mixture is molded. Subsequently, the molded product is carbonized and activated, followed by washing.

3 Claims, 3 Drawing Sheets

(51) Int. Cl.
*B01J 20/20* (2006.01)
*B01J 21/18* (2006.01)
*C01B 31/14* (2006.01)
*B01J 20/30* (2006.01)

(52) U.S. Cl.
CPC ....... *B01J 20/3007* (2013.01); *B01J 20/3071* (2013.01); *B01J 20/3078* (2013.01); *B01J 21/18* (2013.01); *C01B 31/081* (2013.01); *C01B 31/10* (2013.01); *C01B 31/14* (2013.01); *C01P 2006/14* (2013.01); *C01P 2006/21* (2013.01); *C01P 2006/37* (2013.01)

(56) References Cited

U.S. PATENT DOCUMENTS

| | | |
|---|---|---|
| 2012/0085708 A1 | 4/2012 | Redding |
| 2012/0172216 A1 | 7/2012 | Böhringer et al. |
| 2015/0375197 A1 | 12/2015 | Yanagi et al. |

FOREIGN PATENT DOCUMENTS

| | | |
|---|---|---|
| EP | 2960207 | 12/2015 |
| GB | 445342 | 4/1936 |
| JP | 60-050724 | 11/1985 |
| JP | 0316908 | 1/1991 |
| JP | 07138010 | 5/1995 |
| JP | 09187648 | 7/1997 |
| JP | 2004149399 | 5/2004 |
| JP | 2005048798 | 2/2005 |
| JP | 2005319350 | 11/2005 |
| JP | 2009298668 | 12/2009 |
| JP | 2010269994 | 12/2010 |
| JP | 2011057457 | 3/2011 |
| JP | 2015501433 A | 1/2015 |
| WO | 2008/110233 | 9/2008 |
| WO | 2010103323 | 9/2010 |
| WO | 2012172292 | 12/2012 |

OTHER PUBLICATIONS

Chinese Office Action based on co-pending Chinese Application No. 201480009363.X, dated Sep. 7, 2016, 6 Pages.
European Search Report based on co-pending European Application No. 14754777.2, dated Oct. 6, 2016—10 Pages.
Office Action dated Feb. 29, 2016 in U.S. Appl. No. 14/768,982.
International Search Report dated May 27, 2014 in co-pending PCT International Application No. PCT/JP2014/053551, filed Feb. 14, 2014.
International Search Report dated May 27, 2014 in co-pending PCT International Application No. PCT/JP2014/053554, filed Feb. 14, 2014.
ASTM International Designation D2866-11, "Standard Test Method for Total Ash Content of Activated Carbon", Sep. 2012, pp. 1-2.
Kureha Corp., BAC "Bead-Shaped Activated Carbon Pamphlet", 1972, pp. 24-28 (with English abstract).

GRANULAR ACTIVATED CARBON, AND MANUFACTURING METHOD FOR SAME

CROSS-REFERENCE TO RELATED APPLICATIONS

This application is a national stage application filed under 35 USC 371 of PCT/JP2014/053551, filed Feb. 14, 2014, which claims the benefit of Japanese Patent Application No. 2013-031208, filed Feb. 20, 2013, all of which are incorporated herein, in entirety, by reference.

TECHNICAL FIELD

The present invention relates to a novel granular activated carbon and a method for manufacturing the same.

BACKGROUND ART

Activated carbons are widely used as adsorbents, for example, to remove impurities or adjust the concentration of dissolved components. Further, due to their high specific surface area, activated carbons are also used as supports, etc., for various metals and organic substances.

Among such activated carbons, wood-based steam-activated carbons are particularly widely used in the food industry and chemical industry (in particular, pharmaceutical production), and in the purification process of water treatment, etc., because micropores and mesopores are present therein with well-balanced distribution, the impurity content is low, and there is no risk of solution pollution. Wood-based steam-activated carbons are also suitably used as catalyst supports because they have a high specific surface area, have mesopores where the substrate reaction occurs, and have a low impurity content.

Thus, wood-based steam-activated carbons are industrially useful materials; however, the use of wood powder as their raw material causes a limitation in that only powdered activated carbons can be obtained. When powdered activated carbons are used, dust generation may be problematic. Further, it was necessary, after use, to separate the activated carbon and the solution by filtration, which obstructed the use of powdered activated carbons.

Lumber can also be used as the raw material in place of wood powder, and carbonized to form charcoal, followed by steam activation; however, the resulting activated carbons are light and flexible, and cannot be used as granular activated carbons.

Moreover, the raw material wood powder is produced in the process of lumber sawing; however, the yield is decreasing because of lumber resource conservation. Furthermore, methods for effective utilization of wood powder for applications other than activated carbons have progressed; therefore, it is becoming difficult to use wood powder as the raw material for activated carbons.

The development of granular activated carbons that have high pore distribution and purity equivalent to those of wood-based steam-activated carbons is thus anticipated, even without using a wood powder raw material.

As a method for manufacturing an activated carbon having many mesopores, PTL 1 discloses an activated carbon for highly treating clean water obtained by mixing 100 parts by weight of carbonaceous raw material with 0.2 to 1.5 parts by weight (in terms of calcium) of at least one calcium compound, and carbonizing and activating the mixture; and also discloses a method for manufacturing the same.

CITATION LIST

Patent Literature

PTL 1: JPH03-16908A

SUMMARY OF INVENTION

Technical Problem

According to this document, however, it is preferable that the activated carbon after carbonization and activation is not washed. Further, the activated carbon obtained in this document did not have the required hardness of granular activated carbons, and only had low hardness.

An object of the present invention is to provide a granular activated carbon suitable for the purification of various liquids and for catalyst supports, and a method for manufacturing the same.

Solution to Problem

In view of the above object, the present inventors conducted studies on the manufacture of activated carbons having a low impurity content while controlling the proportion of micropores and mesopores, and then found that granular activated carbons suitable for the purification of various liquids and for catalyst supports can be obtained by mixing activated carbons with calcium, and molding the mixture, followed by carbonization, activation, and washing. The present invention has been completed based on this finding.

That is, the present invention relates to the activated carbon and the method for manufacturing the same shown in the following items 1 to 4.

Item 1. A granular activated carbon having the following properties (1) to (3):
 (1) an ignition residue of 2 mass fraction % or less;
 (2) a hardness of 80 mass fraction % or more; and
 (3) a pore volume of 0.55 to 0.75 mL/g, wherein a ratio of a mesopore volume to the pore volume satisfies a relationship represented by formula (1):

$$V \times 0.73 \times 0.80 \leq \frac{Vmeso}{V} \leq V \times 0.73 \times 1.20 \qquad (1)$$

V: pore volume (mL/g)
Vmeso: volume (mL/g) of pores with a diameter of 2 to 30 nm Item 2. A method for manufacturing a granular activated carbon, comprising the following steps (A) to (D) of:
 (A) carbonizing an activated carbon raw material, followed by pulverization;
 (B) mixing the activated carbon obtained in step (A) with a calcium component, followed by molding;
 (C) carbonizing and activating the activated carbon obtained in step (B); and
 (D) washing the activated carbon obtained in step (C).

Item 3. The manufacturing method according to Item 2, wherein the activated carbon raw material is a coconut shell.

Item 4. A granular activated carbon obtained by the manufacturing method according to Item 2 or 3.

The present invention is described in detail below. The present invention includes an invention of a granular activated carbon, an invention of a method for manufacturing the granular activated carbon, an invention of the use of the granular activated carbon for liquid treatment (more specifically, for liquid purification and for adsorption treatment of a liquid for decolorization, etc.), and an invention of the use of the granular activated carbon for catalyst supports.

Activated Carbon

The activated carbon of the present invention is a granular activated carbon having the following properties (1) to (3):

(1) an ignition residue of 2 mass fraction % or less;
(2) a hardness of 80 mass fraction % or more; and
(3) a pore volume of 0.55 to 0.75 mL/g, wherein a ratio of a mesopore volume to the pore volume satisfies a relationship represented by formula (1):

$$V \times 0.73 \times 0.80 \leq \frac{Vmeso}{V} \leq V \times 0.73 \times 1.20 \qquad (1)$$

V: pore volume (mL/g)
Vmeso: volume (mL/g) of pores with a diameter of 2 to 30 nm The following describes properties (1), (2), and (3) in this order.

Property (1)

The ignition residue of the activated carbon of the present invention is 2 mass fraction % or less, and preferably 1.5 mass fraction % or less. The ignition residue is generally measured by JIS K1474 (JIS: Japanese Industrial Standard). Specifically, the activated carbon (sample) of the present invention is subjected to ignition incineration in an electric furnace, and the residue is determined. When the ignition residue is 2 mass fraction % or less, the impurity content is low. Therefore, the activated carbon of the present invention can be suitably used as an activated carbon for liquid phase treatment, without polluting the treatment liquid.

The specific steps (i) to (iv) for measuring ignition residue specified in JIS K1474 are sequentially described below.

(i) The sample (1 to 5 g) is weighed to a precision of 1 mg in a porcelain crucible that has been previously adjusted to a constant weight. The sample has been previously dried in a constant-temperature oven at 115±5° C. for 3 hours, and then cooled to room temperature in a desiccator (using silica gel as a desiccant).

(ii) After step (i), the sample is placed in an electric furnace. First, the sample is gently heated, and then the temperature is gradually increased to completely ash the sample, followed by ignition at 800 to 900° C. for 1 hour.

(iii) After ignition of the sample in step (ii), the sample is cooled in a desiccator (using silica gel as a desiccant), and the mass is weighed to a precision of 1 mg, and the residue is determined.

(iv) The ignition residue is calculated by the following formula (2):

$$A=(R/S) \times 100 \qquad (2)$$

wherein A is the ignition residue (mass fraction %), R is the residue (g), S is the mass (g) of the sample, and "/" means division.

[1] The porcelain crucible is the 30-mL porcelain crucible of type A, B, or C specified in JIS R1301.

[2] The constant-temperature oven can be adjusted to a temperature range of 115±5° C.

[3] The electric furnace can be adjusted to a temperature range of 800 to 900° C.

The ignition residue of the activated carbon of the present invention can be adjusted to 2 mass fraction % or less by, for example, suitably setting the washing time, washing frequency, acid concentration, etc., in step (D) of the method for manufacturing the activated carbon of the present invention, described later.

Property (2)

The hardness of the activated carbon of the present invention is 80 mass fraction % or more, and preferably 85 mass fraction % or more. The hardness is generally measured by JIS K1474. Specifically, the activated carbon (sample) of the present invention is placed in a hardness test plate, together with steel balls, and the plate is shaken, followed by sieving. The mass of the sample remaining on the sieve is determined, and the hardness is determined by comparing the determined mass with the original mass of the sample. When the hardness is 80 mass fraction % or more, the generation of fine powder can be prevented when the activated carbon of the present invention is used as a granular carbon. The upper limit of the hardness is not particularly limited, but is generally 100 mass fraction %.

The specific steps (i) to (vii) for measuring the hardness specified in JIS K1474 are sequentially described below.

(i) The sample is sieved for 10 minutes using two sieves with openings that correspond to the upper and lower limits of the particle size range, by specific steps (i) to (v) for measuring the particle size, described below.

(ii) The sieved sample is placed in a 200-mL, measuring cylinder up to the reference line (100 mL) while slightly tapping the cylinder. The mass of the sample is weighed to a precision of 0.1 g.

(iii) The sample is placed in a hardness test plate, together with 15 steel balls having a diameter of 12.7 mm, and 15 steel balls having a diameter of 9.5 mm.

(iv) The hardness test plate containing the sample is attached to a sieve shaker and shaken for 30 minutes.

(v) The steel balls are removed, and the entire sample is placed in a saucer and a sieve with an opening smaller by 2 degrees than the opening corresponding to the lower limit of the particle size range, and the saucer and sieve are attached to the sieve shaker.

(vi) After shaking for 3 minutes, the mass of each sample remaining on the sieve and saucer is weighed to a precision of 0.1 g. When the total mass of the samples increases and decreases by 2% or more from the initially weighed mass, a retest is performed.

(vii) The hardness is determined by the following formula (3):

$$H=(W/S) \times 100 \qquad (3)$$

wherein H is the hardness (mass fraction %), W is the mass (g) of the sample remaining on the sieve in step (vi), S is the total mass (g) of the samples remaining on the sieve and saucer, and "/" means division.

[1] The sieve is the mesh sieve specified in JIS Z8801-1. The size of the sieve frame is such that the inner diameter of the portion above the sieve surface is 200 mm.

Figure 3:
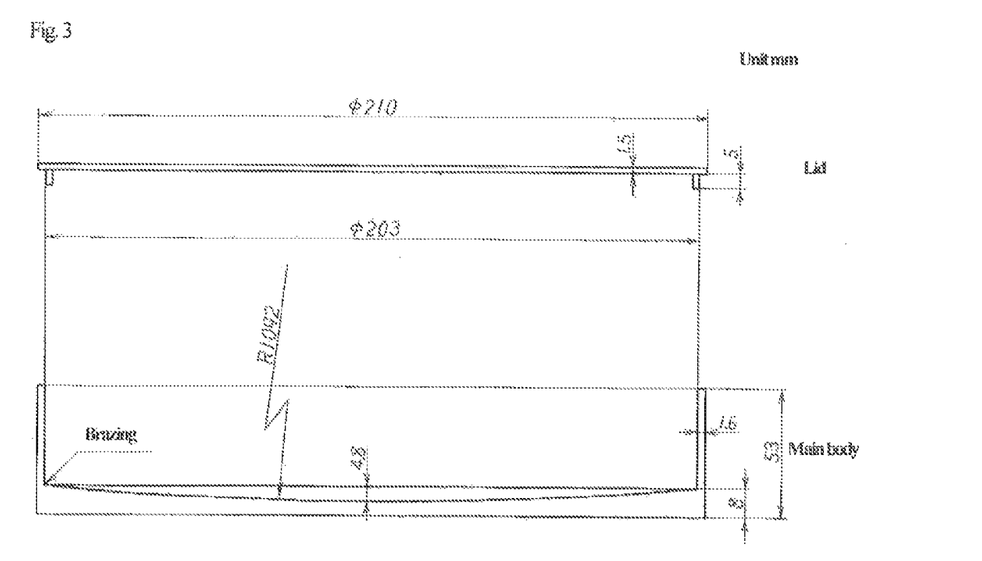
FIG. 3 shows an example of the hardness test plate used for the hardness measurement specified in JIS K1474.

[2] The hardness test plate is made of the material specified in JIS H3100, i.e., C2680P or C2720P (brass plate). FIG. 3 shows an example of the plate.

[3] The sieve shaker is a Tyler sieve shaker or a similar sieve shaker. The number of strokes per minute is 130 to 165, and the number of rotations per minute is 240 to 295.

[4] The steel balls are 15 steel balls having a diameter of 12.7±0.1 mm, and 15 steel balls having a diameter of 9.5±0.1 mm.

[5] The measuring cylinder is the 200-mL measuring cylinder specified in JIS R3505.

The hardness of the activated carbon of the present invention can be adjusted to 80 mass fraction % or more by, for example, suitably setting the type of activated carbon raw material in step (A) of the method for manufacturing the activated carbon of the present invention, described later, and the amount and type of binding component in step (B) of the manufacturing method.

Property (3)

The activated carbon of the present invention has a pore volume of 0.55 to 0.75 mL/g, and preferably 0.55 to 0.70 mL/g. The pore volume is calculated from the amount of nitrogen adsorption at a relative pressure of 0.931 at the boiling point temperature of liquid nitrogen.

Moreover, in the activated carbon of the present invention, the ratio of the mesopore volume (Vmeso) to the pore volume (V) satisfies formula (1) mentioned above. The relationship represented by formula (1) is specific to wood-based steam-activated carbons. The present invention is intended to develop granular activated carbons that have high pore distribution and purity equivalent to those of wood-based steam-activated carbons. General wood-based steam-activated carbons satisfy the relationship: Vmeso/V=0.73; therefore, the range including values 20% larger and smaller than this value is defined as the mesopore ratio similar to that of wood-based steam-activated carbons. In formula (1), Vmeso/V is the ratio of mesopore volume to the pore volume of the activated carbon. This ratio increases as the activation reaction of the activated carbon proceeds, and is therefore defined as the function of pore volume V.

The "mesopore volume (Vmeso)" mentioned herein refers to the volume of pores with a diameter of 2 to 30 nm measured by a nitrogen adsorption method and calculated by the Cranston-Inkley method. The pores are involved in the adsorption performance of a coloring substance.

The pore volume of the activated carbon of the present invention can be adjusted to 0.55 to 0.75 mL/g and adjusted to satisfy formula (1) by, for example, suitably setting the activation temperature, the partial steam pressure during activation, etc., in step (C) of the method for manufacturing the activated carbon of the present invention, described later.

The "granular activated carbon" refers to one in which the particle size specified in JIS K1474 is 0.150 mm or more. The fact that the particle size specified in JIS K1474 is 0.150 mm or more has the same meaning as the fact that the particle size measured according to JIS K1474, described later, is 0.150 mm or more. Activated carbons in which the particle size specified in JIS K1474 is less than 0.150 mm are powdered activated carbons, which are not included in the present invention.

In the activated carbon of the present invention, the particle size measured according to JIS K1474 is preferably 0.150 to 8.00 mm, more preferably about 0.300 to 4.70 mm, and particularly preferably about 0.500 to 2.36 mm.

The specific steps (i) to (v) for measuring the particle size specified in JIS K1474 are described below.

(i) The activated carbon (sample) of the present invention is dried in a constant-temperature oven at 115±5° C. for 3 hours, and then cooled to room temperature in a desiccator (using silica gel as a desiccant). Then, about 100 g of sample is weighed to a precision of 0.1 g.

(ii) Six or seven sieves with openings gradually larger from an opening smaller by one level than the opening corresponding to the lower limit of the particle size range of the sample to an opening larger by one level than the opening corresponding to the upper limit are sequentially laminated on a saucer in the ascending order of openings. When the particle size range of the sample is narrow, the number of sieves is reduced, as appropriate. When the particle size range is wide, the number of sieves is increased, as appropriate.

(iii) After the sample is placed in the topmost sieve, the sieve is covered with a lid, and attached to a sieve shaker, followed by sieving for 10 minutes.

(iv) The mass of each sample remaining on each sieve and saucer is weighed to a precision of 0.1 g. When the total mass of the samples remaining on each sieve and saucer increases and decreases by 2% or more from the initially weighed mass, a retest is performed.

(v) The particle size is calculated by the following formula (4):

$$G_i = (W_i/S) \times 100 \qquad (4)$$

wherein $G_i$ is the particle size (mass fraction %), $W_i$ is the mass (g) of the samples remaining on each sieve and saucer, S is the total mass (g) of the samples remaining on each sieve and saucer, and "/" means division. The particle size $G_i$ indicates the particle size in the range from the opening of a sieve (No. i) to the opening of another sieve (No. i+1) larger by one level than sieve No. i, and indicates the mass fraction % in the specific particle size range with respect to the total mass of the samples. For example, in the present specification, the fact that the particle size measured according to JIS K1474 is 0.150 mm or more indicates that 95 mass fraction % or more of sample has a particle size range of 0.150 mm or more.

(1) The constant-temperature oven can be adjusted to a temperature range of 115±5° C.

(2) The sieve and sieve shaker are the same as those used to measure the hardness mentioned above.

The specific surface area of the activated carbon of the present invention is not particularly limited. For example, the specific surface area is generally 700 to 2,000 m²/g, and preferably 800 to 1,500 m²/g.

Manufacturing Method

The method for manufacturing the activated carbon of the present invention comprises the following steps (A) to (D):

(A) carbonizing an activated carbon raw material, followed by pulverization;

(B) mixing the activated carbon obtained in step (A) with a calcium component, followed by molding;

(C) carbonizing and activating the activated carbon obtained in step (B); and (D) washing the activated carbon obtained in step (C).

The activated carbon manufacturing method of the present invention comprising steps (A) to (D) above can suitably produce a granular activated carbon having the following properties (1) to (3):

(1) an ignition residue of 2 mass fraction % or less;

(2) a hardness of 80 mass fraction % or more; and (3) a pore volume of 0.55 to 0.75 mL/g, wherein a ratio of mesopore volume to the pore volume satisfies a relationship represented by formula (1):

$$V \times 0.73 \times 0.80 \leq \frac{Vmeso}{V} \leq V \times 0.73 \times 1.20 \qquad (1)$$

V: pore volume (mL/g)

Vmeso: volume (mL/g) of pores with a diameter of 2 to 30 nm

In particular, in the above manufacturing method, the activated carbon is mixed with a calcium component after pulverization of the carbonized product and before molding in a general method for manufacturing granular activated carbon.

The following describes steps (A), (B), (C), and (D) in this order.

Step (A) Carbonization and Pulverization of Activated Carbon Raw Material

The raw material of the activated carbon of the present invention is not particularly limited, as long as it is a generally used activated carbon raw material and has a low impurity content. Examples thereof include coconut shells (e.g., palm coconut shell and coconut shell), natural fibers (e.g., hemp and cotton), synthetic fibers (e.g., rayon and polyester), synthetic resins (e.g., polyacrylonitrile, phenol resin, polyvinylidene chloride, polycarbonate, and polyvinyl alcohol), and the like. Preferred among these are coconut shells.

Although the carbonization conditions of the activated carbon raw material are not particularly limited, carbonization is generally performed by heating to 300 to 900° C., and more preferably 300 to 600° C., under oxygen-free conditions.

The carbonization time can be suitably set depending on the raw material used and the device to perform carbonization, and is about 30 minutes to 20 hours, and preferably about 1 hour to 10 hours.

The carbonization treatment is performed by using a known manufacturing device, such as a rotary kiln.

The volatile component of the carbonized product is 5 to 40 mass fraction %, preferably 10 to 30 mass fraction %, and more preferably 10 to 20 mass fraction %.

Subsequently, the carbonized product obtained by carbonizing the activated carbon raw material is pulverized. The pulverization conditions are not particularly limited, and the pulverization can be performed by using a generally used pulverization device. The average particle diameter (median diameter) of the pulverized product is generally 2 to 100 μm, and preferably 10 to 70 μm.

Step (B: Mixing with Calcium Component, and Molding

The pulverized product obtained by pulverization is mixed with a calcium component, and the mixture is then molded.

Calcium components are not particularly limited. For example, (1) water-soluble calcium compounds, (2) water-insoluble calcium compounds, etc., can be used. Calcium components can be used singly or in a combination of two or more.

Examples of water-soluble calcium compounds include calcium chloride, calcium nitrate, calcium acetate, and the like. Among these, calcium chloride is preferably used because cracked gas is not generated during heating.

Examples of water-insoluble calcium compounds include calcium carbonate, calcium hydroxide, and the like. Among these, calcium carbonate is preferably used, in terms of handling safety.

Although the amount of the calcium component is not particularly limited, the amount as calcium (in terms of calcium) is 0.5 to 1.5 parts by weight, and preferably 0.6 to 1.2 parts by weight, based on 100 parts by weight of the pulverized product after carbonization (the activated carbon obtained in step (A)). Moreover, in order to improve dispersibility, it is preferable to add a calcium component-containing aqueous solution to the pulverized product after carbonization; however, it may be sufficient to simply mix a powdery calcium component and the pulverized product after carbonization.

When the pulverized product after carbonization is brought into contact with a calcium component, it is preferable to further mix a binding component, etc., so as to facilitate subsequent molding. Binding components are not particularly limited, and may be those generally used for the manufacture of activated carbons. Examples thereof include pulp waste water, phenol resin, melamine resin, petroleum pitch (e.g., hard pitch), coal tar, and the like. These binding components can be used singly or in a combination of two or more. Preferred are petroleum pitch, etc., and more preferred is hard pitch.

The amount of the binding component is suitably set depending on the molded state of the molded product. For example, about 40 to 45 parts by weight of binding component is used based on 100 parts by weight of the pulverized product after carbonization.

Further, in order to facilitate mixing between the pulverized product after carbonization and a calcium component, a binding auxiliary component, a primary binder, etc., can be mixed together with the binding component.

Binding auxiliary components are not particularly limited, as long as they can soften or dissolve the binding component to facilitate mixing. Examples thereof include heavy oil, creosote oil, high-boiling-point liquid organic compounds (castor oil, lubricating oil, etc.), and the like. These binding auxiliary components can be used singly or in a combination of two or more. Preferred are creosote oil, etc.

The amount of the binding auxiliary component is suitably set depending on the type and amount of the binding component. For example, about 5 to 10 parts by weight of binding auxiliary component is used based on 25 parts by weight of binding component.

Primary binders are not particularly limited, as long as they can temporarily fix the pulverized product before the binding component exhibits its effect. Examples thereof include lignin, hydroxymethylcellulose, glue, and the like. These primary binders can be used singly or in a combination of two or more. Preferred are lignin, etc.

The amount of the primary binder is suitably set depending on the type and amount of the binding component. For example, about 1 to 2 parts by weight of the primary binder is used based on 25 parts by weight of binding component.

When the pulverized product after carbonization is brought into contact with a calcium component, water can also be mixed so as to adjust the hardness of the obtained molded product. The amount of water is suitably set depending on the molded state of the molded product. For example, about 10 to 15 parts by weight of water is used based on 100 parts by weight of the pulverized product after carbonization.

The conditions of mixing the pulverized product after carbonization, a calcium component, and a binding component are not particularly limited, and they can be mixed by a known method. For example, mixing can be performed by using a mixer, such as a paddle-type mixer, a batch-type kneader, or a continuous-type kneader.

As the mixing order, for example, the pulverized product after carbonization and a binding component are supplied to a kneader and mixed, and then a calcium component ((1) a water-soluble calcium compound, (2) a water-insoluble calcium compound, (3) an aqueous solution of a water-soluble calcium compound, or the like) is supplied and mixed. Alternatively, a binding component and a calcium component mentioned above are previously mixed, and they are simultaneously supplied to the pulverized product after carbonization. The mixing time is not particularly limited, as long as the above components can be sufficiently mixed. The mixing time is generally about 10 to 60 minutes.

The method for molding the mixture obtained by the above mixing process is not particularly limited, and a known molding method can be used. Examples of the method include extrusion molding, spherical molding by tumbling granulation, compression molding using a tableting machine, rolling using a roll, and the like. Preferred is extrusion molding. The particle size of the molded product can be determined so as to be suitable for the subsequent carbonization and activation treatments. For example, the particle size of the molded product is 0.2 to 11 mm, preferably 0.5 to 4 mm, and more preferably 1 to 2.8 mm.

Step (C): Carbonization and Activation of Molded Product

Although the carbonization conditions of the molded product are not particularly limited, a carbonized product can be obtained by, for example, heating to 500 to 900° C., and more preferably 500 to 800° C., in an oxygen-free inert atmosphere.

The carbonization time can be suitably set depending on the raw material used and the carbonization device, and is generally about 2 to 10 hours, and preferably about 2 to 8 hours.

The carbonization treatment is performed by using a known manufacturing device, such as a rotary kiln.

The carbonized product obtained by carbonizing the molded product is activated by steam.

The activation treatment is performed in a temperature range of about 800 to 1,000° C., and preferably about 850 to 950° C., using a known manufacturing device, such as a rotary kiln or a fluidized bed furnace. The steam partial pressure may be in the range of 10 to 100%, and is preferably in the range of 30 to 100%.

Moreover, when the activation yield is set to 40 to 55%, a product having the desired performance can be obtained. When the activation yield is overly low, the hardness is reduced, and impurities are concentrated. Consequently, it becomes difficult to remove the impurities in the washing step.

The activation time varies depending on the raw material used, activation temperature, manufacturing device, etc., and cannot be generalized; however, the activation time can be suitably determined within a range that satisfies the above activation yield.

Thereafter, the activated carbon after activation is sieved to regulate the particle size. The particle size is as described in "Property (3)" in "Activated Carbon" above.

Step (D): Washing

The obtained activated carbon is washed by a known method using a mineral acid, such as hydrochloric acid or nitric acid. Mineral acid washing is performed, for example, by bringing the activated carbon into contact with hydrochloric acid. The activated carbon can be brought into contact with hydrochloric acid by, for example, immersing the activated carbon in a suitable amount of hydrochloric acid with a suitable concentration, or by flowing the hydrochloric acid on the activated carbon.

The concentration of the mineral acid (e.g., hydrochloric acid) may be determined so that alkaline components contained in the activated carbon can be neutralized, and so that metal salts (ash content) contained as impurities can be dissolved. For example, the concentration of hydrogen chloride is 0.1 to 15 mass fraction %, and preferably 0.5 to 5 mass fraction %.

The activated carbon to be washed with a mineral acid may be in a state of the activated carbon after activation, or the activated carbon after activation may be previously washed with water to remove water-soluble inorganic components.

Mineral acid washing is continued until the pH of the activated carbon becomes neutral. The washing method may be a batch or continuous process. The washing time is not particularly limited, but is preferably about 0.5 to 10 hours. The washing temperature is generally 5 to 80° C., and preferably 10 to 80° C. High-temperature washing can reduce the washing time.

Washing by a mineral acid mentioned above may be followed by further washing with water. Components eluted from the activated carbon by mineral acid washing can be sufficiently removed by this water-washing process. The water-washing method may be a batch or continuous process. The washing time is not particularly limited, but is preferably about 1 to 20 hours. The washing temperature is generally 5 to 80° C., and preferably 10 to 80° C. High-temperature washing can reduce the washing time.

In order to prevent adverse effects resulting from the elution of the impurities, the ignition residue of the activated carbon after mineral acid washing, or after mineral acid washing, followed by further water washing, is 2 mass fraction % or less, and preferably 1.5 mass fraction % or less.

After washing, the obtained activated carbon is dried. The drying means is not particularly limited, and a known drying means can be used. For example, the activated carbon is heated at about 50 to 200° C., and preferably about 80 to 150° C., using a device, such as a constant-temperature oven, fluidized dryer, vibrating fluidized dryer, or rotary kiln. The drying loss of the activated carbon after drying is preferably 5 mass fraction % or less, and more preferably 3 mass fraction % or less.

The dried activated carbon can be further pulverized before use. The particle size after pulverization is not particularly limited. For example, the particle size is 0.500 to 2.36 mm, 0.500 to 1.70 mm, 0.300 to 0.850 mm, 0.250 to 0.500 mm, 0.180 to 0.355 mm, or the like, that is used as general granular activated carbon. The particle size is preferably about 0.150 to 8.00 mm, more preferably about 0.300 to 4.70 mm, and particularly preferably about 0.500 to 2.36 mm.

Advantageous Effects of Invention

The activated carbon of the present invention has mesopores and micropores with well-balanced distribution and has a low impurity content, as in wood-based powdered carbons. On the other hand, in contrast to wood-based powdered activated carbons, the activated carbon of the present invention is a hard granular activated carbon, and can be easily used for liquid treatment applications, particularly in a purification process of the food or pharmaceutical industry. The activated carbon of the present invention can also be suitably used as a support for various catalysts, in terms of pore distribution, hardness, and purity.

DESCRIPTION OF EMBODIMENTS

The present invention is described in detail below with reference to Examples and Comparative Examples; however, the present invention is not limited thereto.

EXAMPLES

Example 1

Coconut shells (produced on Mindanao Island of the Republic of the Philippines) were carbonized at 550° C. for 8 hours, and then pulverized to an average particle diameter of 20 to 80 μm. The pulverized product (1,000 g), a calcium aqueous solution prepared by dissolving 25 g of calcium chloride (special grade chemical; produced by Wako Pure Chemical Industries, Ltd.) in 57 g of water, 250 g of hard pitch having a softening point of 110° C., 80 g of creosote, 16 g of lignin (SAN X-M, produced by Nippon Paper Industries Co., Ltd.), and 73 g of water were placed in a kneader and mixed for 25 minutes. Then, the resulting mixture was extruded from an extrusion granulator (pore size: 4 mm), and carbonization and steam activation were performed under the conditions shown in Table 1. The obtained activated product was washed by boiling in a hydrochloric acid aqueous solution (concentration: 3 wt. %) for 10 minutes, and then boiled in water for 10 minutes three times. After draining, the resulting product was dried in an electric dryer adjusted to 115±5° C., and pulverized by using a roll mill to a particle size of 0.600 to 0.212 mm, followed by particle size regulation, thereby obtaining an activated carbon.

Examples 2 to 4

In Example 1, activated carbons were obtained by changing the molding formulation and the carbonization and steam-activation conditions as shown in Table 1.

Example 5

Coconut shells (produced on Mindanao Island of the Republic of the Philippines) were carbonized at 550° C. for 8 hours, and then pulverized to an average particle diameter of 20 to 80 μm. The pulverized product (1,000 g), 27.5 g of calcium carbonate (special grade chemical; produced by Wako Pure Chemical Industries, Ltd.), 250 g of hard pitch having a softening point of 110'C, 80 g of creosote, 16 g of lignin (SAN X-M, produced by Nippon Paper Industries Co., Ltd.), and 130 g of water were placed in a kneader and mixed for 25 minutes. Then, the resulting mixture was extruded from an extrusion granulator (pore size: 4 mm), and carbonization and steam activation were performed under the conditions shown in Table 1. The obtained activated product was washed by boiling in a hydrochloric acid aqueous solution (concentration: 3 wt. %) for 10 minutes, and then boiled in water for 10 minutes three times. After draining, the resulting product was dried in an electric dryer adjusted to 115±5° C., and pulverized by using a roll mill to a particle size of 0.600 to 0.212 mm, followed by particle size regulation, thereby obtaining an activated carbon.

Comparative Example 1

An activated carbon was obtained in the same manner as in Example 1, except that the conditions were changed as shown in Table 1, and washing was not performed.

Comparative Example 2

An activated carbon was obtained in the same manner as in Example 1, except that calcium chloride was not mixed.

TABLE 1

|  | Ex. 1 | Ex. 2 | Ex. 3 | Ex. 4 | Ex. 5 | Comp. Ex. 1 | Comp. Ex. 2 |
| --- | --- | --- | --- | --- | --- | --- | --- |
| Molding formulation | | | | | | | |
| Carbonated coconut shell (g) | 1000 | 1000 | 1000 | 1000 | 1000 | 1000 | 1000 |
| Hard pitch (g) | 250 | 250 | 250 | 250 | 250 | 250 | 250 |
| Creosote (g) | 80 | 80 | 80 | 80 | 80 | 80 | 80 |
| Lignin (g) | 16 | 16 | 16 | 16 | 16 | 16 | 16 |
| Water (g) | 73 | 73 | 73 | 73 | 130 | 73 | 73 |
| Calcium chloride (g) | 25 | 25 | 30 | 30 | — | 25 | — |
| Calcium carbonate (g) | — | — | — | — | 27.5 | — | — |
| Pt. wt. of calcium based on 100 pts. wt. of carbonated coconut shell | 0.90 | 0.90 | 1.08 | 1.08 | 1.10 | 0.90 | 0.00 |
| Water dissolving calcium component (g) | 57 | 57 | 57 | 57 | — | 57 | 57 |
| Carbonization | | | | | | | |
| Carbonization reaching temperature (° C.) | 650 | 850 | 650 | 650 | 650 | 650 | 650 |
| Temperature increase rate (° C./min) | 5 | 5 | 5 | 5 | 5 | 5 | 5 |
| Retention time (min) | 30 | 30 | 30 | 30 | 30 | 30 | 30 |
| Steam activation | | | | | | | |
| Activation temperature (° C.) | 900 | 900 | 900 | 900 | 900 | 900 | 900 |
| Activation time (min) | 150 | 120 | 120 | 150 | 135 | 180 | 150 |
| Activation yield (%) | 45.2 | 50.3 | 51.1 | 40.9 | 45.5 | 34.4 | 49.7 |

Performance Measurement of Activated Carbon

Nitrogen adsorption isotherms of the activated carbons obtained in Examples 1 to 5 and Comparative Examples 1 and 2 above, and activated carbons obtained in Comparative Examples 3 to 8 shown below, were measured at the boiling point temperature of liquid nitrogen, and the pore distribution was determined by the CI method. Pores with a diameter of up to 2 nm were regarded as micropores, and pores with a diameter of 2 to 30 nm were regarded as mesopores. Further, the ignition residue and hardness were measured by JIS K1474.

Comparative Example 3

A commercially available wood-based steam-activated carbon for purification (Purified Shirasagi-N, produced by Japan EnviroChemicals) was used.

Comparative Example 4

A commercially available wood-based steam-activated carbon for purification (Shirasagi M, produced by Japan EnviroChemicals) was used.

Comparative Example 5

A commercially available wood-based steam-activated carbon for purification (Shirasagi A, produced by Japan EnviroChemicals) was used.

Comparative Example 6

A commercially available wood-based steam-activated carbon for catalyst support (Shirasagi FAC-10, produced by Japan EnviroChemicals) was used.

Comparative Example 7

A commercially available steam-activated granular activated carbon for purification using a coconut shell as a raw material (Granular Shirasagi G2c10/20-2, produced by Japan EnviroChemicals) was used.

Comparative Example 8

A commercially available steam-activated granular activated carbon for purification using a coconut shell as a raw material (Granular Shirasagi LH2c20/48, produced by Japan EnviroChemicals) was used.

Tables 2 and 3 show the performance measurement results. The hardness of the activated carbons of Comparative Examples 3 to 6, which were powdered activated carbons, could not be evaluated.

Figure 1:
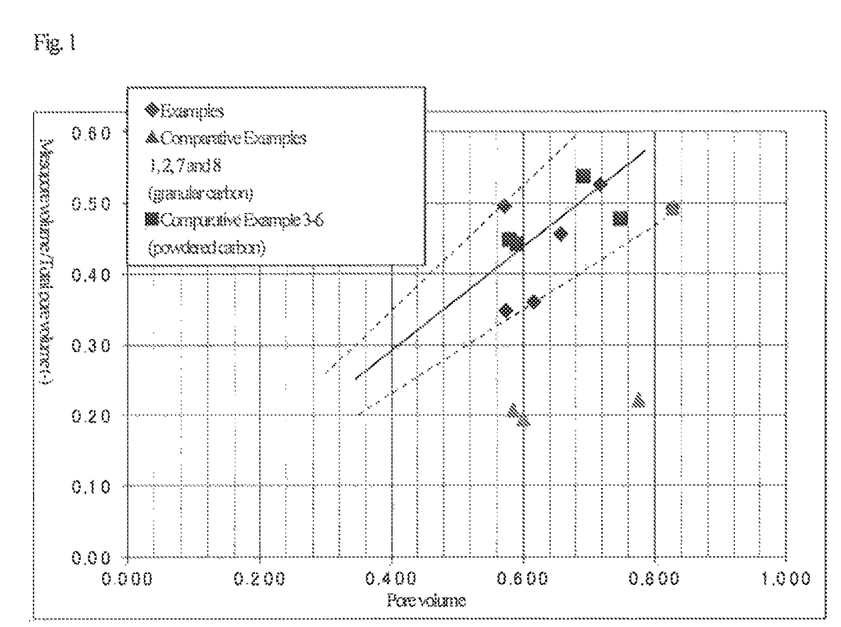
FIG. 1 shows the mesopore volume/total pore volume of Examples 1 to 4 and Comparative Examples 1 to 8. The solid line represents Vmeso/V=0.73×V, and the two dotted lines represent (a) Vmeso/V=0.73×0.80×V and (b) Vmeso/V=0.73×1.20×V.

FIG. 1 shows the mesopore volume/total pore volume ($V_{meso}/V$ in formula (1)).

TABLE 2

|  | Ex. 1 | Ex. 2 | Ex. 3 | Ex. 4 | Ex. 5 |
|---|---|---|---|---|---|
| Ignition residue (mass fracton %) | 0.9 | 1.1 | 0.9 | 1.0 | 0.4 |
| Hardness (mass fraction %) | 86.2 | 84.6 | 90.5 | 85.2 | 85.2 |
| Specific surface area ($m^2/g$) | 1107 | 1076 | 900 | 1109 | 1143 |
| Pore volume (mL/g) | 0.657 | 0.574 | 0.572 | 0.717 | 0.617 |
| Mesopore volume (mL/g) | 0.299 | 0.200 | 0.283 | 0.376 | 0.220 |
| Mesopore volume/ total pore volume | 0.46 | 0.35 | 0.49 | 0.53 | 0.36 |

TABLE 3

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Ignition residue (mass fraction %) | 1.6 | 1.0 | 2.5 | 2.9 | 1.0 | 0.9 | 0.5 | 0.8 |
| Hardness (mass fraction %) | 77.0 | 91.2 | — | — | — | — | 98.4 | 94.7 |
| Specific surface area ($m^2/g$) | 1362 | 1258 | 999 | 1023 | 1099 | 1253 | 1303 | 1666 |
| Pore volume (mL/g) | 0.828 | 0.586 | 0.58 | 0.591 | 0.693 | 0.748 | 0.601 | 0.775 |
| Mesopore volume (mL/g) | 0.409 | 0.122 | 0.260 | 0.261 | 0.372 | 0.357 | 0.118 | 0.173 |
| Mesopore volume/ total pore volume | 0.49 | 0.21 | 0.45 | 0.44 | 0.54 | 0.48 | 0.20 | 0.22 |

In the activated carbons of the present invention (Examples 1 to 5), the mesopore volume/total pore volume (Vmeso/V in formula (1)) was similar to that of the wood-based steam-activated carbons (Comparative Examples 3 to 6). The activated carbons of the present invention had low ignition residue, which indicates an impurity content, and had sufficient hardness as required for granular activated carbons.

In contrast, in the activated carbon of Comparative Example 1 prepared without washing, the amount of impurities was not sufficiently reduced, and the hardness was low.

Further, the activated carbon prepared without adding calcium (Comparative Example 2) had a smaller number of mesopores, Decolorization Performance Evaluation 1 of Activated Carbon (Measurement)

Figure 2:
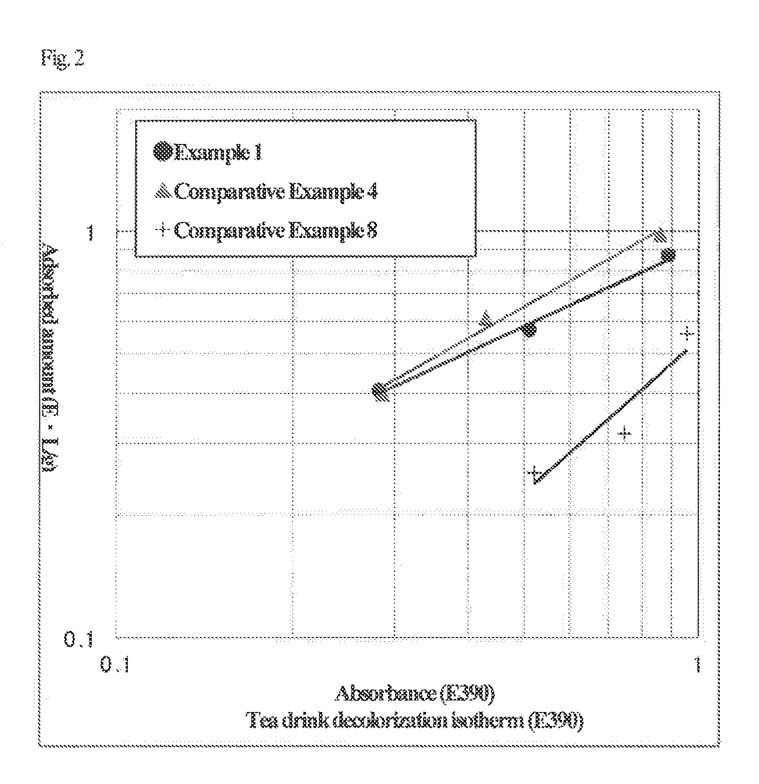
FIG. 2 is a graph showing the relationship between the absorbance and the adsorbed amount when Decolorization Performance Evaluation 1 is performed on the activated carbons of Example 1 and Comparative Examples 4 and 8.

The activated carbon of Example 1, the activated carbon of Comparative Example 4 (steam-activated powdered activated carbon), and the activated carbon of Comparative Example 8 (general coconut shell-activated carbon) were prepared, and each activated carbon was pulverized. The pulverization of each activated carbon was performed so that 90% or more of a suitable amount of sample was passed through the 45-μm mesh sieve specified in JIS Z 8801-1 (sieve frame size: inner diameter of the portion above the sieve surface: 75 mm). Subsequently, the pulverized activated carbons of Example 1 and Comparative Examples 4 and 8 were each added to 50 mL, of commercially available tea drink (registered trademark: Gogo No Kocha, produced by Kirin Beverage Co., Ltd.) tea-with-lemon. Each of the resulting mixtures was shaken at 25° C. for 1 hour, followed by filtration, thereby obtaining a filtrate. Next, the absorbance of each filtrate was measured at a wavelength of 390 nm, and the relationship between the residual concentration and the adsorbed amount was arranged. FIG. 2 shows the results.

The activated carbon of Example 1 (the activated carbon of the present invention) had much higher decolorization performance than the coconut shell-activated carbon (Comparative Example 8). Further, even though the activated carbon of Example 1 was a granular activated carbon, its decolorization capacity was equivalent to that of the commercially available wood-based steam-activated powdered activated carbon (Comparative Example 4).

Decolorization Performance Evaluation 2 of Activated Carbon (Visual Observation)

The activated carbons of Examples 1 to 5 and Comparative Example 4 were prepared, and each activated carbon was pulverized. The pulverization of each activated carbon was performed in the same manner as in the pulverization in Evaluation 1 above. Subsequently, the pulverized activated carbons of Examples 1 to 5 and Comparative Example 4 were each added to 50 mL of commercially available tea drink (registered trademark: Gogo No Kocha, produced by Kirin Beverage Co., Ltd.) tea-with-lemon. Each of the resulting mixtures was shaken at 25° C. for 1 hour, followed by filtration, thereby obtaining a filtrate. The filtrates obtained by liquid treatment of the activated carbons of Examples 1 to 5 were each decolorized to about the same degree as that of the above filtrate obtained by liquid treatment in Comparative Example 4.

INDUSTRIAL APPLICABILITY

The activated carbon of the present invention can be used as a purification adsorbent for liquid treatment applications, particularly applications in which the presence of impurities causes problems, for example, in the food or pharmaceutical industry as a granular activated carbon in a column passing system. Furthermore, due to its low impurity content, the activated carbon of the present invention can also be suitably used as a catalyst support, such as a fixed-bed catalyst support.

We claim:

1. A granular activated carbon having the following properties (1) to (3):
    (1) an ignition residue of 2 mass fraction % or less;
    (2) a hardness of 80 mass fraction % or more; and
    (3) a pore volume of 0.55 to 0.75 mL/g, wherein a ratio of a mesopore volume to the pore volume satisfies a relationship represented by formula (1):

$$V \times 0.73 \times 0.80 \leq \frac{Vmeso}{V} \leq V \times 0.73 \times 1.20 \qquad (1)$$

V: pore volume (mL/g)
Vmeso: volume (mL/g) of pores with a diameter of 2 to 30 nm.

2. The granular activated carbon according to claim 1, wherein the granular activated carbon is produced using at least one calcium component selected from the group consisting of calcium chloride, calcium carbonate, and calcium hydroxide.

3. The granular activated carbon according to claim 2, wherein the amount of the calcium component, in terms of calcium, is 0.5 to 1.5 parts by weight based on 100 parts by weight of carbonized raw material.

* * * * *

UNITED STATES PATENT AND TRADEMARK OFFICE
CERTIFICATE OF CORRECTION

PATENT NO. : 9,802,824 B2
APPLICATION NO. : 14/768925
DATED : October 31, 2017
INVENTOR(S) : Juichi Yanagi et al.

It is certified that error appears in the above-identified patent and that said Letters Patent is hereby corrected as shown below:

On the Title Page

In item (73) Assignee:
Please list the Assignee as Osaka Gas Chemicals, Co., Ltd.

Signed and Sealed this
Twenty-seventh Day of March, 2018

Andrei Iancu
*Director of the United States Patent and Trademark Office*